(12) United States Patent
Watanabe et al.

(10) Patent No.: US 11,677,086 B2
(45) Date of Patent: Jun. 13, 2023

(54) CONTROL SYSTEM, MOVING BODY, AND CONTROL METHOD

(71) Applicant: HONDA MOTOR CO., LTD., Tokyo (JP)

(72) Inventors: Shinya Watanabe, Wako (JP); Takuya Tamura, Wako (JP); Nobumasa Toyoshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 17/329,198

(22) Filed: May 25, 2021

(65) Prior Publication Data

US 2021/0376352 A1 Dec. 2, 2021

(30) Foreign Application Priority Data

May 29, 2020 (JP) .............................. JP2020-094472

(51) Int. Cl.
*H01M 8/04* (2016.01)
*H01M 8/04701* (2016.01)
*B60L 58/34* (2019.01)
*H01M 8/0432* (2016.01)

(52) U.S. Cl.
CPC ......... *H01M 8/04738* (2013.01); *B60L 58/34* (2019.02); *H01M 8/04373* (2013.01); *H01M 8/04723* (2013.01); *H01M 2250/20* (2013.01)

(58) Field of Classification Search
CPC ......... H01M 8/04738; H01M 8/04373; H01M 8/04723; B60L 58/34

USPC ........................................................... 429/423
See application file for complete search history.

(56) References Cited

U.S. PATENT DOCUMENTS

| | | | | |
|---|---|---|---|---|
| 2007/0154756 | A1* | 7/2007 | Fujita ................ | H01M 8/04776 429/432 |
| 2016/0380283 | A1* | 12/2016 | Yamada ............ | H01M 8/04228 429/429 |
| 2020/0047586 | A1* | 2/2020 | Gonze ................ | B60H 1/00278 |
| 2020/0052313 | A1* | 2/2020 | Kajiwara ............. | B60L 3/0053 |
| 2020/0122545 | A1* | 4/2020 | Lee .................... | B60H 1/00278 |

FOREIGN PATENT DOCUMENTS

| | | |
|---|---|---|
| JP | 2006-309974 | 11/2006 |
| JP | 2007-165104 | 6/2007 |
| JP | 2015-156769 | 8/2015 |

* cited by examiner

*Primary Examiner* — James M Erwin
(74) *Attorney, Agent, or Firm* — Amin, Turocy & Watson, LLP

(57) ABSTRACT

According to an embodiment, a control system includes a fuel cell configured to generate electric power using an anode and a cathode, a power storage device capable of storing the electric power generated by the fuel cell, auxiliary equipment to which the electric power is able to be supplied, and a controller configured to control operations of the fuel cell and the auxiliary equipment. The controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment.

13 Claims, 6 Drawing Sheets

CONTROL SYSTEM, MOVING BODY, AND CONTROL METHOD

CROSS-REFERENCE TO RELATED APPLICATION

Priority is claimed on Japanese Patent Application No. 2020-094472, filed May 29, 2020, the content of which is incorporated herein by reference.

BACKGROUND

Field of the Invention

The present invention relates to a control system, a moving body, and a control method.

Description of Related Art

Conventionally, technology for causing an operation of a system to be continued by limiting the power loss of an internal load that consumes surplus power at the time of an independent operation, adjusting a coolant flow rate in accordance with an estimated amount of heat of a fuel cell, or stably operating the fuel cell when an abnormality has occurred in a voltage converter is known as technology related to a fuel cell system (for example, Japanese Unexamined Patent Application, First Publication Nos. 2015-156769, 2006-309974, and 2007-165104).

SUMMARY

For example, when a fuel cell system is operated under an extremely low temperature environment or the like, it may be necessary to intentionally generate electric power for the activation of a fuel cell or the like. In this case, because the generated electric power is stored in the battery, but becomes surplus power when the battery is in a fully charged state, there is a need for causing auxiliary equipment or the like to consume the surplus power or the like. However, if the auxiliary equipment is turned on and off intermittently to consume the surplus power, the auxiliary equipment may easily deteriorate.

The present invention has been made in consideration of such circumstances, and an objective of the present invention is to provide a control system, a moving body, and a control method capable of more appropriately controlling an operation of auxiliary equipment that consumes electric power generated by a fuel cell.

A control system, a moving body, and a control method according to the present invention adopt the following configurations.

(1): According to an aspect of the present invention, there is provided a control system including: a fuel cell configured to generate electric power using an anode and a cathode; a power storage device capable of storing the electric power generated by the fuel cell; auxiliary equipment to which the electric power is able to be supplied; and a controller configured to control operations of the fuel cell and the auxiliary equipment, wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment.

(2): In the above-described aspect (1), the controller causes the amount of output of the electric power to be consumed by the auxiliary equipment to be reduced before a predicted point in time when a temperature associated with the auxiliary equipment is predicted to be a temperature at which an operation of the auxiliary equipment will be forcibly stopped in the future.

(3): In the above-described aspect (1), the controller adjusts the degree at which electric power to be consumed by the auxiliary equipment is limited so that the amount of output of the electric power to be consumed by the auxiliary equipment is gradually reduced until the amount of output to be consumed by the auxiliary equipment reaches a predetermined amount of output when a temperature associated with the auxiliary equipment is predicted to be a temperature at which an operation of the auxiliary equipment will be forcibly stopped in the future.

(4): In the above-described aspect (1), the auxiliary equipment includes at least one of a compressor that pumps an oxidizing gas to the fuel cell, a pump that circulates and supplies a fuel gas to the fuel cell, and a cooling pump that supplies a refrigerant to the fuel cell and an air conditioning device.

(5): In the above-described aspect (4), the controller performs control so that a temperature of the fuel cell is able to be increased according to an output of at least one of the compressor, the pump, the air conditioning device, and the cooling pump in accordance with a situation of the power storage device.

(6): In the above-described aspect (1), the auxiliary equipment includes a flow path switching valve that switches between a flow path for circulating a refrigerant for cooling the fuel cell within the control system and a flow path for supplying the refrigerant to an air conditioning device included in the auxiliary equipment.

(7): In the above-described aspect (1), the controller includes a control mode in which surplus power generated by the fuel cell is consumed by the auxiliary equipment and controls the amount of output of electric power to be consumed by the auxiliary equipment by providing a predetermined range for a temperature associated with the auxiliary equipment when the control mode is executed.

(8): According to another aspect of the present invention, there is provided a moving body comprising the control system according to the above-described aspect (1).

(9): In the above-described aspect (8), the moving body includes a vehicle, and the controller causes surplus power of the fuel cell to be consumed by causing an air conditioning device within the vehicle to be operated independently of the presence or absence of an occupant of the vehicle or the presence or absence of an operation of the occupant in accordance with a power storage state of the power storage device when power generation of the fuel cell is performed at the time of stopping of the vehicle.

(10): In the above-described aspect (8), the controller performs control for causing the moving body to be retracted to a predetermined position when an abnormality in the moving body has been detected.

(11): According to another aspect of the present invention, there is provided a control method including: controlling, by a computer of a control system including a fuel cell configured to generate electric power using an anode and a cathode, a power storage device capable of storing the electric power generated by the fuel cell, and auxiliary equipment to which the electric power is able to be supplied, operations of the fuel cell and the auxiliary equipment; performing, by the computer, control so that the electric power is consumed by the auxiliary equipment in accordance with a power storage state of the power storage device at the time of power generation of the fuel cell; and adjusting, by the computer, one or both of a timing and a degree at which electric power to be consumed by the auxiliary equipment is limited on the basis of temperature information associated with the auxiliary equipment.

(12): In the above-described aspect (11), the computer causes the amount of output of the electric power to be consumed by the auxiliary equipment to be reduced before a predicted point in time when a temperature associated with the auxiliary equipment is predicted to be a temperature at which an operation of the auxiliary equipment will be forcibly stopped in the future.

(13): In the above-described aspect (11), the computer adjusts the degree at which electric power to be consumed by the auxiliary equipment is limited so that the amount of output of the electric power to be consumed by the auxiliary equipment is gradually reduced until the amount of output of the electric power to be consumed by the auxiliary equipment reaches a predetermined amount of output when a temperature associated with the auxiliary equipment is predicted to be a temperature at which an operation of the auxiliary equipment will be forcibly stopped in the future.

According to the above-described aspects (1) to (13), it is possible to more appropriately control an operation of auxiliary equipment that consumes electric power generated by a fuel cell.

DESCRIPTION OF EMBODIMENTS

Hereinafter, embodiments of a control system, a moving body, and a control method of the present invention will be described with reference to the drawings. Hereinafter, an example in which the control system is mounted in an electric vehicle will be described. The electric vehicle is, for example, a fuel cell vehicle that uses the electric power generated by the fuel cell as the electric power for traveling or the electric power for operating an in-vehicle device. The electric vehicle is an example of the moving body and is a two-wheeled, three-wheeled, or four-wheeled vehicle or the like. The control system may be mounted in the moving body (for example, a ship, a flying object, or a robot) other than the electric vehicle.

[Electric Vehicle]

Figure 1:
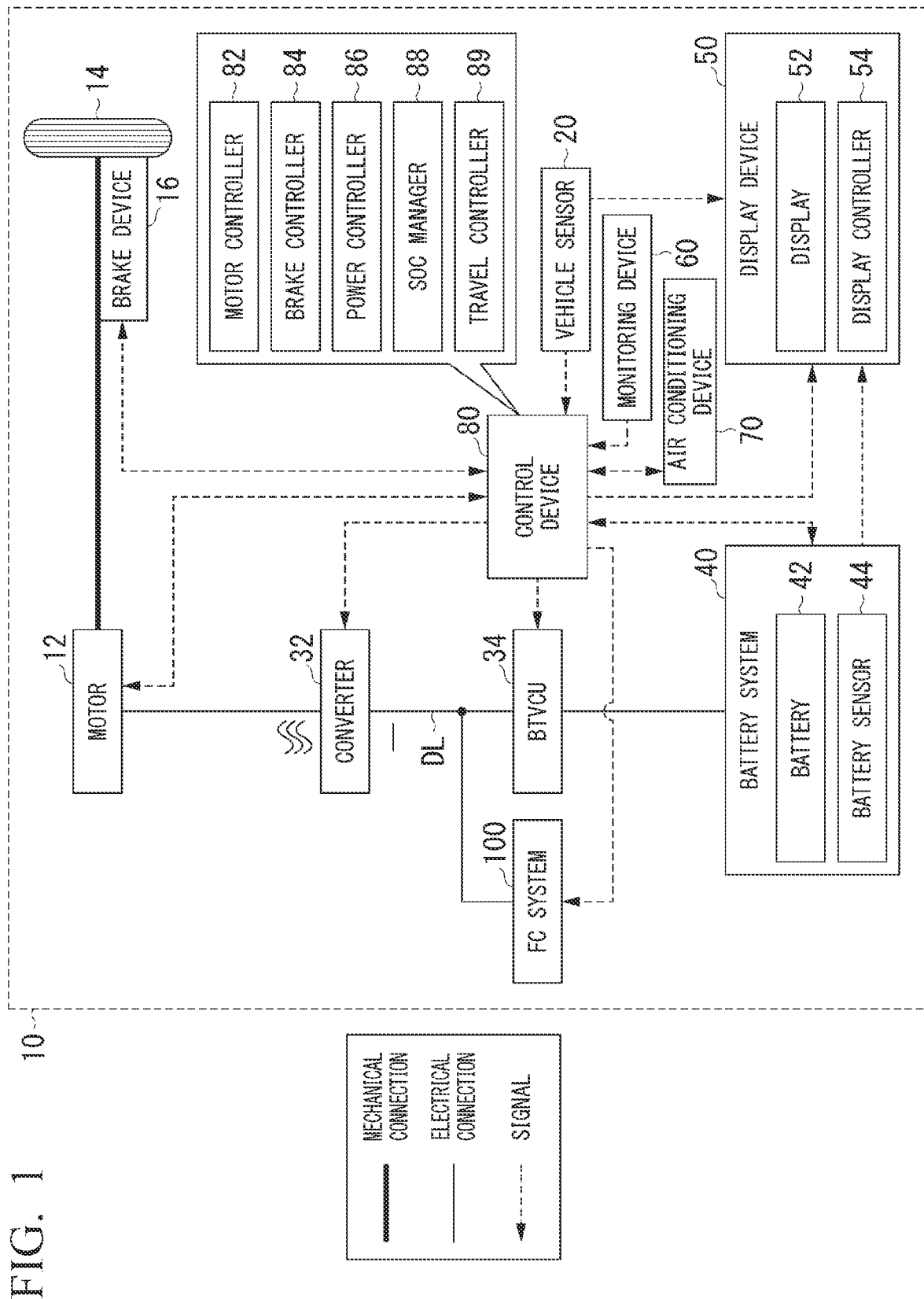
FIG. 1 is a diagram showing an example of a configuration of an electric vehicle equipped with a control system according to an embodiment.

FIG. 1 is a diagram showing an example of a configuration of an electric vehicle equipped with the control system according to the embodiment. As shown in FIG. 1, an electric vehicle 10 includes, for example, a motor 12, a drive wheel 14, a brake device 16, a vehicle sensor 20, a converter 32, a battery voltage control unit (BTVCU) 34, a battery system (an example of a power storage device) 40, a display device 50, a monitoring device 60, an air conditioning device 70, a control device 80, and a fuel cell (FC) system 100. The motor 12 is an example of a "load." A combination of a battery system 40, a display device 50, a monitoring device 60, an air conditioning device 70, a control device 80, and an FC system 100 is an example of the "control system." A combination of the control device 80 and an FC control device to be described below is an example of a "controller."

The motor 12 is, for example, a three-phase alternating current (AC) electric motor. The rotor of the motor 12 is connected to the drive wheel 14. The motor 12 outputs a driving force used for traveling of the electric vehicle 10 to the drive wheel 14 using at least one of electric power generated by the FC system 100 and electric power stored by the battery system 40. The motor 12 uses kinetic energy of the vehicle to generate electric power when the vehicle decelerates.

The brake device 16 includes, for example, a brake caliper, a cylinder configured to transfer hydraulic pressure to the brake caliper, and an electric motor configured to generate hydraulic pressure in the cylinder. The brake device 16 may include a mechanism configured to transfer the hydraulic pressure generated by the operation of the brake pedal to the cylinder via a master cylinder as a backup. The brake device 16 may be an electronically controlled hydraulic brake device configured to transfer the hydraulic pressure of the master cylinder to the cylinder.

The vehicle sensor 20 includes, for example, an accelerator opening degree sensor, a vehicle speed sensor, a brake depression amount sensor, and the like. The accelerator opening degree sensor is attached to an accelerator pedal which is an example of an operation element for receiving an acceleration instruction from a driver, detects an amount of operation of the accelerator pedal, and outputs the detected amount of operation as an accelerator opening degree to the control device 80. The vehicle speed sensor includes, for example, a wheel speed sensor attached to each wheel and a speed calculator and integrates wheel speeds detected by wheel speed sensors to derive the speed of the vehicle (a vehicle speed) and output the derived speed to the control device 80 and the display device 50. The brake depression amount sensor is attached to the brake pedal, detects an amount of operation of the brake pedal, and outputs the detected amount of operation as an amount of brake depression to the control device 80.

The vehicle sensor 20 may include an acceleration sensor configured to detect the acceleration of the electric vehicle 10, a yaw rate sensor configured to detect the angular speed around a vertical axis, a direction sensor configured to detect the direction of the electric vehicle 10, and the like. The vehicle sensor 20 may include a location sensor configured to detect a location of the electric vehicle 10. The location sensor acquires location information of the electric vehicle 10 from, for example, a global navigation satellite system (GNSS) receiver mounted in the electric vehicle 10 or a global positioning system (GPS) device. The vehicle sensor 20 may include a room temperature sensor configured to measure a temperature (a room temperature) inside a vehicle cabin of the electric vehicle 10. Various types of information detected by the vehicle sensor 20 are output to the control device 80.

The converter 32 is, for example, an AC-direct current (DC) converter. A DC side terminal of the converter 32 is connected to a DC link DL. The battery system 40 is connected to the DC link DL via the BTVCU 34. The converter 32 converts an AC voltage obtained through power generation by the motor 12 into a DC voltage and outputs the DC voltage to the DC link DL.

The BTVCU 34 is, for example, a step-up DC-DC converter. The BTVCU 34 boosts the DC voltage supplied from the battery system 40 and outputs the boosted DC voltage to the DC link DL. The BTVCU 34 outputs a regenerative voltage supplied from the motor 12 or an FC voltage supplied from the FC system 100 to the battery system 40.

The battery system 40 includes, for example, a battery 42 and a battery sensor 44. The battery 42 is, for example, a secondary battery such as a lithium-ion battery. For example, the battery 42 stores the electric power generated by the motor 12 or the FC system 100 and is discharged for the traveling of the electric vehicle 10 or for the operation of the in-vehicle device.

The battery sensor 44 includes, for example, an electric current sensor, a voltage sensor, and a temperature sensor. The battery sensor 44 detects, for example, an electric current value, a voltage value, and a temperature of the battery 42. The battery sensor 44 outputs the electric current value, the voltage value, the temperature, and the like that have been detected to the control device 80.

The battery system 40 may be connected to, for example, an external charging facility to charge the battery 42 with the electric power supplied from a charging/discharging device.

The display device 50 includes, for example, a display 52 and a display controller 54. The display 52 is, for example, a display or a head-up display (HUD) provided within a meter or on an instrument panel. The display 52 displays various types of information according to control of the display controller 54. The display controller 54 causes the display 52 to display an image based on information output by the battery system 40 or information output by the FC system 100. The display controller 54 causes the display 52 to display an image based on information output by the vehicle sensor 20 or the control device 80. The display controller 54 causes the display 52 to display an image indicating the vehicle speed or the like output by the vehicle sensor 20. The display device 50 may include a speaker configured to output a sound and may output a sound, an alarm, or the like associated with an image displayed on the display 52.

For example, the monitoring device 60 includes a camera for imaging a space outside the electric vehicle 10, a radar or a light detection and ranging (LIDAR) sensor having a detection range outside the electric vehicle 10, a physical object recognition device for performing a sensor fusion process on the basis of outputs thereof, and the like. The monitoring device 60 estimates types of physical objects (particularly, vehicles, pedestrians, and bicycles) present around the electric vehicle 10 and outputs the estimated types of physical objects together with information of positions and speeds thereof to the control device 80.

The air conditioning device 70 controls the air conditioning of the vehicle cabin by controlling the control device 80. Specifically, the air conditioning device 70 adjusts an air state of the vehicle cabin so that the temperature measured by a room temperature sensor included in the vehicle sensor 20 becomes the temperature set by the occupant of the electric vehicle 10. The air conditioning device 70 may be operated to consume surplus power according to the control of the FC system 100 independently of the operation of the occupant. Details of the air conditioning device 70 will be described below.

The FC system 100 includes the fuel cell. The fuel cell is, for example, a battery configured to generate electric power using an anode and a cathode. For example, the fuel cell generates electric power when hydrogen contained as fuel in a fuel gas reacts with oxygen contained as an oxidant in air. The FC system 100 outputs the generated electric power to, for example, the DC link DL between the converter 32 and the BTVCU 34. Thereby, the electric power supplied by the FC system 100 is supplied to the motor 12 via the converter 32 or supplied to the battery system 40 via the BTVCU 34 and is stored in the battery 42. The electric power supplied by the FC system 100 may be supplied to the auxiliary equipment within the electric vehicle 10. Details of the FC system 100 will be described below.

The control device 80 controls the traveling of the electric vehicle 10, the operation of the in-vehicle device, and the like. The control device 80 includes, for example, a motor controller 82, a brake controller 84, a power controller 86, an SOC manager 88, and a travel controller 89. Each of the motor controller 82, the brake controller 84, the power controller 86, the SOC manager 88, and the travel controller 89 is implemented, for example, by a hardware processor such as a central processing unit (CPU) executing a program (software). Some or all of these components may be implemented by hardware (a circuit including circuitry) such as a large scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory of the electric vehicle 10 or may be stored in a removable storage medium such as a DVD or a CD-ROM and installed in the HDD or the flash memory of the electric vehicle 10 when the storage medium (the non-transitory storage medium) is mounted in a drive device. The control device 80 may be, for example, one master electronic control unit (ECU), and at least some components (for example, the motor controller 82, the brake controller 84, and the power controller 86) may be replaced with control devices such as separate control devices (for example, a motor ECU, a brake ECU, a battery ECU, and an FC ECU).

The motor controller 82 calculates the driving force required for the motor 12 on the basis of the output of the vehicle sensor 20 and controls the motor 12 so that the calculated driving force is output.

The brake controller 84 calculates a braking force required for the brake device 16 on the basis of the output of the vehicle sensor 20 and controls the brake device 16 so that the calculated braking force is output.

The power controller 86 calculates total required electric power required for the battery system 40 and the FC system 100 on the basis of the output of the vehicle sensor 20. For example, the power controller 86 calculates a torque to be output by the motor 12 on the basis of an accelerator opening degree and a vehicle speed and calculates the total required electric power by calculating a sum of required drive shaft power obtained from the torque and a rotational speed of the motor 12 and electric power required for the auxiliary equipment or the like.

The SOC manager 88 manages a charging state (a storage state) of the battery system 40. For example, the SOC manager 88 calculates a state of charge (SOC) (a charging rate) of the battery 42 on the basis of the output of the battery sensor 44. A calculation result is output to the power controller 86.

For example, when the SOC of the battery 42 managed by the SOC manager 88 is less than a first predetermined value, the power controller 86 executes control for charging the battery 42 using power generation by the FC system 100 or causes the display device 50 to output information for prompting the occupant to charge the battery 42 according to the supply of electric power from an external charging facility. The power controller 86 stops charging control when the SOC of the battery 42 is greater than the first predetermined value and is greater than or equal to a second predetermined value or performs control for causing auxiliary equipment or the like to consume the surplus power generated by the FC system 100.

The travel controller 89 executes driving control for the electric vehicle 10 on the basis of information acquired by, for example, the monitoring device 60 or the vehicle sensor 20. The travel controller 89 may execute driving control of the electric vehicle 10 on the basis of map information in addition to the information acquired by the monitoring device 60 or the vehicle sensor 20. For example, the driving control may be for causing the electric vehicle 10 to travel by controlling one or both of steering and acceleration/deceleration of the electric vehicle 10. The driving control includes, for example, driving assistance control of an advanced driver assistance system (ADAS) or the like. The ADAS includes, for example, a lane keeping assistance system (LKAS), an adaptive cruise control system (ACC), a collision mitigation brake system (CMBS) and the like. The driving control may include, for example, evacuation driving in which the electric vehicle 10 is stopped at a predetermined position (for example, a safe place such as a shoulder of a traveling road) when an abnormality has been detected in the electric vehicle 10. The abnormality in the electric vehicle 10 is an abnormality related to the traveling of the electric vehicle 10, and includes, for example, an abnormality related to power generation in the FC system 100, charging/discharging in the battery system 40, an operation by the auxiliary equipment or the like, and the like.

[Fc System]

Figure 2:
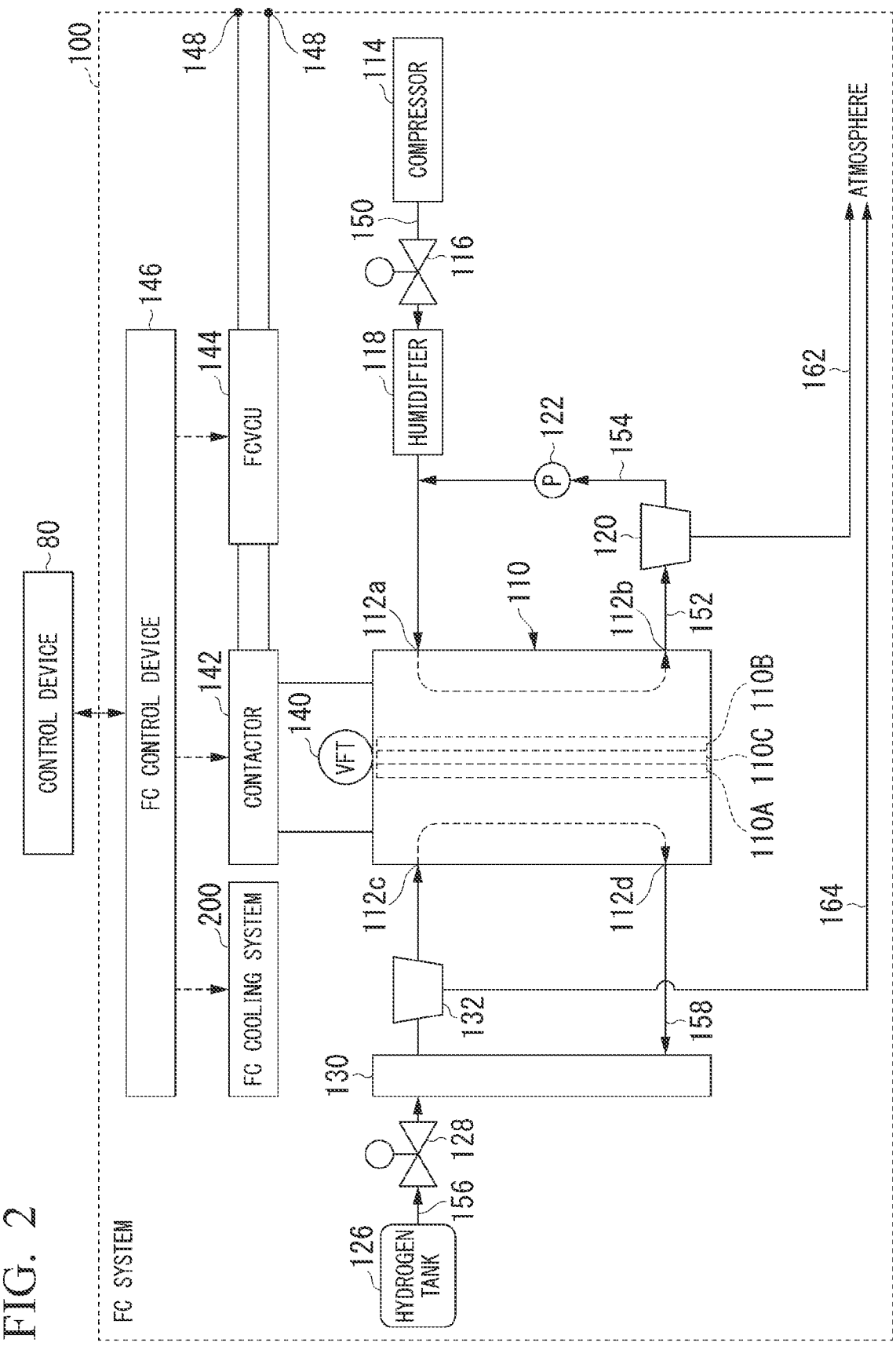
FIG. 2 is a diagram showing an example of a schematic configuration of a fuel cell (FC) system according to the embodiment.

Next, details of the FC system 100 will be described. FIG. 2 is a diagram showing an example of a schematic configuration of the FC system 100 according to the embodiment. The FC system 100 of the present embodiment is not limited to the following configuration and may have, for example, any configuration as long as it is a system configuration in which electric power is generated using an anode and a cathode. The FC system 100 shown in FIG. 2 includes, for example, an FC stack 110, a compressor 114, a sealing inlet valve 116, a humidifier 118, a gas-liquid separator 120, an exhaust gas circulation pump (P) 122, a hydrogen tank 126, a hydrogen supply valve 128, a hydrogen circulator 130, a gas-liquid separator 132, a temperature sensor (VFT) 140, a contactor 142, a fuel cell voltage control unit (FCVCU) 144, an FC control device 146, and an FC cooling system 200. Each of the FCVCU 144 and the FC control device 146 is implemented, for example, by a hardware processor such as a CPU executing a program (software). Some or all of these components may be implemented by hardware (a circuit including circuitry) such as an LSI circuit, an ASIC, an FPGA, or a GPU or may be implemented by software and hardware in cooperation. The program may be pre-stored in a storage device (a storage device including a non-transitory storage medium) such as an HDD or a flash memory of the FC system 100 or may be stored in a removable storage medium such as a DVD or a CD-ROM and installed in the HDD or the flash memory of the FC system 100 when the storage medium (the non-transitory storage medium) is mounted in a drive device.

The FC stack 110 includes a laminate (not shown) in which a plurality of fuel cells are laminated, and a pair of end plates (not shown) configured to sandwich the laminate from both sides in a lamination direction. The fuel cell includes a membrane electrode assembly (MEA) and a pair of separators configured to sandwich the membrane electrode assembly from both sides in a bonding direction. The membrane electrode assembly includes, for example, an anode 110A made of an anode catalyst and a gas diffusion layer, a cathode 110B made of a cathode catalyst and a gas diffusion layer, and a solid polymer electrolyte membrane 110C made of a cation-exchange membrane or the like sandwiched between the anode 110A and the cathode 110B from both sides in a thickness direction.

A fuel gas containing hydrogen as fuel is supplied from the hydrogen tank 126 to the anode 110A. Air, which is an oxidant gas (a reaction gas) containing oxygen as an oxidant, is supplied from the compressor 114 to the cathode 110B. The hydrogen supplied to the anode 110A is ionized by a catalytic reaction on an anode catalyst and hydrogen ions move to the cathode 110B via the solid polymer electrolyte membrane 110C that is appropriately humidified. Electrons generated by the movement of hydrogen ions can be taken out to an external circuit (the FCVCU 144 or the like) as a DC. The hydrogen ions that have moved from the anode 110A onto a cathode catalyst of the cathode 110B react with the oxygen supplied to the cathode 110B and the electrons on the cathode catalyst to generate water.

The compressor 114 includes a motor and the like that are driven and controlled by the FC control device 146 and pumps an oxidizing gas to the fuel cell by taking in and compressing air from the outside using the driving force of the motor and feeding the compressed air to the oxidant gas supply path 150 connected to the cathode 110B.

The sealing inlet valve 116 is provided in the oxidant gas supply path 150, which connect the compressor 114 and a cathode supply port 112a capable of supplying air to the cathode 110B of the FC stack 110 and is opened and closed according to control of the FC control device 146.

The humidifier 118 humidifies the air fed from the compressor 114 to the oxidant gas supply path 150. More specifically, for example, the humidifier 118 includes a water permeable membrane such as a hollow fiber membrane and adds moisture to the air by causing the air from the compressor 114 to be in contact with the moisture via the water permeable membrane.

The gas-liquid separator 120 causes a cathode exhaust gas expelled from a cathode discharge port 112b to an oxidant gas discharge path 152 and the liquid water to be expelled into the atmosphere via the cathode exhaust path 162 without being consumed by the cathode 110B. The gas-liquid separator 120 may separate the cathode exhaust gas expelled to the oxidant gas discharge path 152 from the liquid water and the separated cathode exhaust gas may be allowed to flow into an exhaust gas recirculation path 154.

The exhaust gas circulation pump 122 is provided in the exhaust gas recirculation path 154, mixes the cathode exhaust gas that has flowed from the gas-liquid separator 120 to the exhaust gas recirculation path 154 with the air flowing through the oxidant gas supply path 150 from the sealing inlet valve 116 to the cathode supply port 112*a*, and supplies a mix of the cathode exhaust gas and the air to the cathode 110B again.

The hydrogen tank 126 stores hydrogen in a compressed state. The hydrogen supply valve 128 is provided in a fuel gas supply path 156 that connects the hydrogen tank 126 and an anode supply port 112*c* capable of supplying hydrogen to the anode 110A of the FC stack 110. When the hydrogen supply valve 128 is opened according to the control of the FC control device 146, the hydrogen stored in the hydrogen tank 126 is supplied to the fuel gas supply path 156.

The hydrogen circulator 130 is, for example, a pump that circulates and supplies a fuel gas to the fuel cell. For example, the hydrogen circulator 130 causes the anode exhaust gas expelled from an anode discharge port 112*d* to a fuel gas discharge path 158 to circulate to the fuel gas supply path 156 flowing into the gas-liquid separator 132 without being consumed by the anode 110A.

The gas-liquid separator 132 separates the anodic exhaust gas and the liquid water that circulate from the fuel gas discharge path 158 to the fuel gas supply path 156 according to the action of the hydrogen circulator 130. The gas-liquid separator 132 supplies the anode exhaust gas separated from the liquid water to the anode supply port 112*c* of the FC stack 110. The gas-liquid separator 132 causes the separated liquid water to be expelled into the atmosphere through a drain pipe 164.

The temperature sensor 140 detects temperatures of the anode 110A and the cathode 110B of the FC stack 110 and outputs a detection signal (temperature information) to the FC control device 146.

The contactor 142 is provided between the anode 110A and the cathode 110B of the FC stack 110 and the FCVCU 144. The contactor 142 electrically connects or disconnects the FC stack 110 and the FCVCU 144 on the basis of the control from the FC control device 146.

The FCVCU 144 is, for example, a step-up DC-DC converter. The FCVCU 144 is disposed between the anode 110A and the cathode 110B of the FC stack 110 and an electrical load via the contactor 142. The FCVCU 144 boosts the voltage of an output terminal 148 connected to the electric load side to a target voltage determined by the FC control device 146. For example, the FCVCU 144 boosts the voltage output from the FC stack 110 to the target voltage and outputs the voltage to the output terminal 148.

The FC control device 146 performs control regarding power generation or cooling in the FC system 100. For example, the FC control device 146 may be replaced with a control device such as the FC ECU. The FC control device 146 may control the electric vehicle 10 in cooperation with the control device 80. For example, when it is necessary to warm up the FC system 100 and the power controller 86 determines that a required amount of electric power to be generated by the FC system 100 is greater than or equal to a predetermined amount, the FC control device 146 controls the warm-up of the FC system 100. For example, the power controller 86 acquires a detection signal of the temperature sensor 140 from the FC control device 146 and determines that the warm-up of the FC system 100 is required when the temperature of the FC stack 110 detected by the temperature sensor 140 is less than a threshold value. The power controller 86 acquires the detection signal of the temperature sensor 140 from the FC control device 146 while the warm-up control of the FC system 100 is being performed and determines that the warm-up control of the FC system 100 has been completed when the temperature of the FC stack 110 detected by the temperature sensor 140 is greater than or equal to the threshold value.

The FC control device 146 causes the FC stack 110 to be heated or cooled using the FC cooling system 200 so that the temperature from the temperature sensor 140 is maintained in a predetermined temperature range when the FC system 100 is generating electric power. The FC control device 146 may perform control for causing the auxiliary equipment to consume the electric power generated by the FC system 100. The auxiliary equipment may include, for example, at least one of the components included in the battery system 40, the display device 50, the monitoring device 60, the air conditioning device 70, and the FC system 100. Generally, because the power consumption due to temperature control is large, it is preferable to include at least one of components included in the FC cooling system 200 or the air conditioning device 70 that controls the temperature so that efficient power consumption can be implemented when the surplus power generated by the FC system 100 is consumed.

[FC Cooling System]

Figure 3:
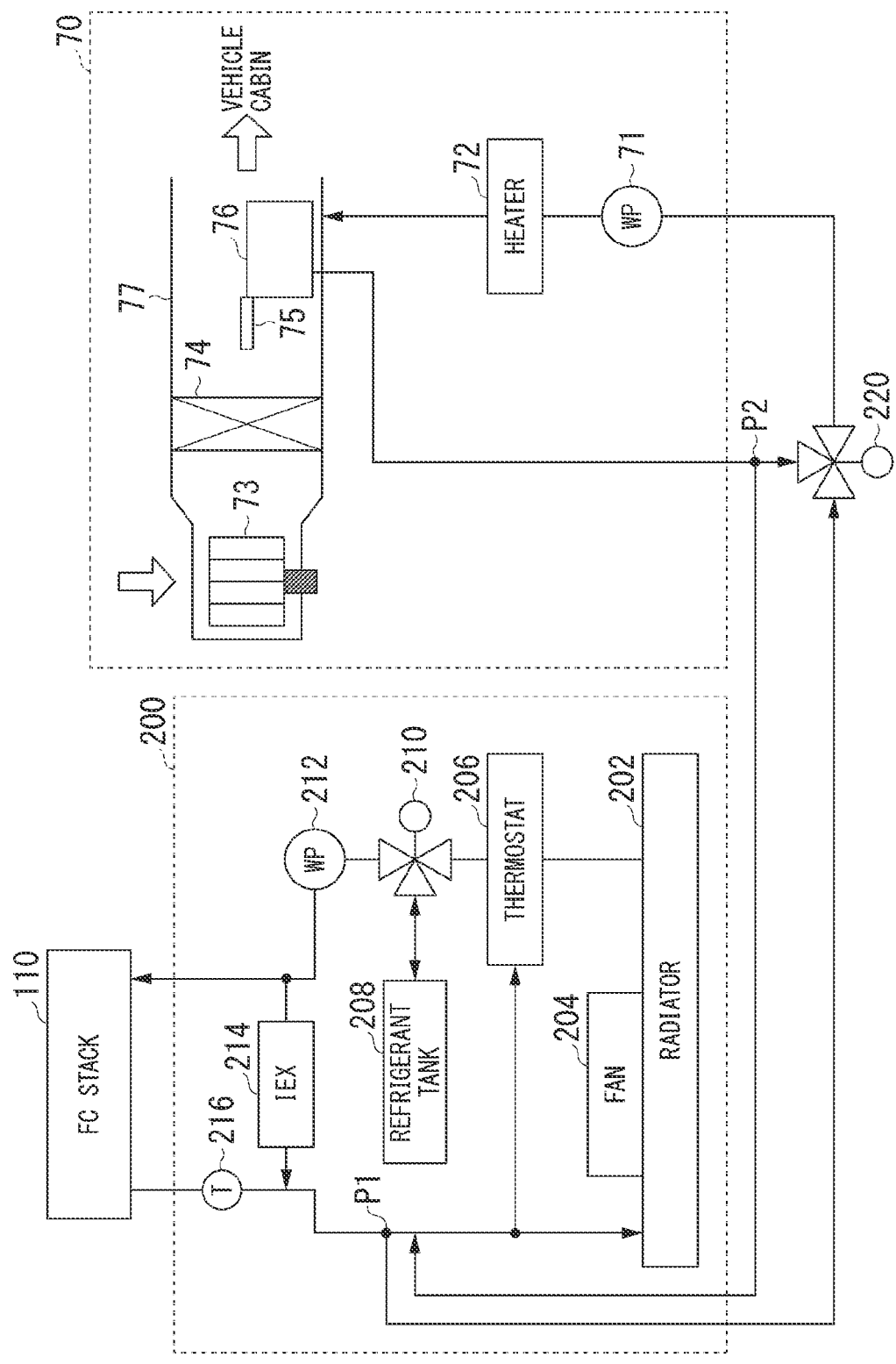
FIG. 3 is a diagram showing an example of a schematic configuration of an FC cooling system according to the embodiment.

Next, a configuration of the FC cooling system 200 will be described with reference to the drawings. FIG. 3 is a diagram showing an example of a schematic configuration of the FC cooling system according to the embodiment. The FC cooling system 200 of the present embodiment is not limited to the following configuration and may be any configuration as long as the temperature of the FC system 100 can be adjusted. In the example of FIG. 3, the air conditioning device 70 is shown as an example of the auxiliary equipment that is allowed to consume the electric power generated by the FC system 100. In the example of FIG. 3, the flow path of the refrigerant supplied to the FC cooling system 200 and the air conditioning device 70 is shown. The FC cooling system 200 includes a radiator 202, a fan 204, a thermostat 206, a refrigerant tank 208, a refrigerant supply valve 210, a first refrigerant supply pump (cooling pump) 212, an ion exchange resin 214, and a refrigerant temperature sensor 216. The radiator 202 is a heat exchanger for dissipating heat from a high-temperature refrigerant flowing out of the refrigerant flow path. The refrigerant is, for example, water. The refrigerant may be, for example, water containing ethylene glycol, or may be another refrigerant. The radiator 202 dissipates heat from the refrigerant flowing out of the refrigerant flow path through heat exchange with air. The fan 204 is provided near the radiator 202 and sends wind toward the radiator 202 according to the control of the FC control device 146.

The thermostat 206 is a temperature adjusting mechanism that adjusts the temperature of the FC system 100 by switching the flow or detour of the refrigerant to the radiator 202 in accordance with the temperature of the refrigerant detected by the refrigerant temperature sensor 216. The refrigerant tank 208 stores the refrigerant. The first refrigerant supply pump 212 is a pump for circulating a cooling medium that compresses the refrigerant toward the refrigerant flow path according to the control of the FC control device 146. The refrigerant supply valve 210 is provided between the thermostat 206 and the first refrigerant supply pump 212. According to the control of the FC control device 146, the refrigerant supply valve 210 performs valve switching so that the refrigerant is supplied from the refrigerant tank 208 to the circulation system when the refrigerant in the entire system is insufficient and the refrigerant is moved from the circulation system to the refrigerant tank 208 when the refrigerant is excessive.

The first refrigerant supply pump 212 compresses the refrigerant from the thermostat 206 or the refrigerant from the refrigerant tank 208. The refrigerant compressed by the first refrigerant supply pump 212 circulates along the flow path within the FC stack 110 and is expelled from the FC stack 110. The ion exchange resin 214 is provided in a bypass path for bypassing the FC stack 110 and removes impurities (for example, conductive components) in the cooling medium. The refrigerant temperature sensor 216 detects the temperature of the refrigerant expelled by the FC stack 110. The refrigerant temperature sensor 216 may be provided at another position in the flow path of the refrigerant or a plurality of sensors may be provided.

Here, a branch point P1 for branching a first flow path (circulation line) along which the refrigerant expelled from a refrigerant outlet of the FC stack 110 is allowed to flow into the radiator 202 and the refrigerant is circulated within the FC cooling system 200 and a second flow path (circulation line) along which the refrigerant expelled from the refrigerant outlet of the FC stack 110 is supplied and circulated to the air conditioning device 70 side is provided in the refrigerant flow path (pipe) shown in FIG. 3. The refrigerant branched into the second flow path according to the branch point P1 flows into the air conditioning device 70 through a three-way valve 220. The three-way valve 220 is a flow path switching valve that switches the flow path of the refrigerant according to the control of the FC control device 146.

The air conditioning device 70 includes, for example, a second refrigerant supply pump 71, a heater 72, a blower 73, an evaporator 74, an air mix door 75, and a heater core 76. In the air conditioning device 70 shown in FIG. 3, the blower 73, the evaporator 74, the air mix door 75, and the heater core 76 are installed within a duct 77 in order from the upstream side. The duct 77 is installed so that an upstream end opens to communicate with the inside and outside of the vehicle and a downstream end opens to communicate with the vehicle cabin. The components of the air conditioning device 70 other than the duct 77 are operated according to the control of, for example, the control device 80 or the FC control device 146, and electric power is consumed according to the operation.

The second refrigerant supply pump 71 is a refrigerant circulation pump that pumps a refrigerant toward the heater core 76 within the air conditioning device 70. The heater 72 is an electric heater that heats the refrigerant flowing therein by the second refrigerant supply pump 71 to a predetermined temperature. The heater 72 may be provided with a temperature sensor that measures the temperature of the refrigerant or the temperature of the heater main body. The refrigerant expelled from the heater 72 is connected to an inflow port of the heater core 76.

The blower 73 is provided near the upstream end in the duct 77, suctions air from inside and outside the vehicle, and sends the air to the downstream side. The blower 73 is provided with a fan or the like and an air volume is controlled by a rotational speed of the fan. The evaporator 74 cools the air sent from the blower 73 and functions as a vaporizer at the time of the cooling operation. The air mix door 75 adjusts a flow rate ratio between the air flowing into the heater core 76 and the air bypassing the heater core 76. Thereby, the temperature of the air sent into the vehicle cabin is adjusted. The air mix door 75 may be a rotary type in which one end on the heater core 76 side is fixed and the other end rotates or a slide type in which a slide operation is performed so that a part or all of the air flowing into the heater core 76 or the air bypassing the heater core 76 is blocked. The heater core 76 is a heat exchanger that exchanges heat between the high-temperature refrigerant flowing in from the heater 72 side and the air guided by the air mix door 75 and flowing through the duct 77. Thereby, the air cooled by the evaporator 74 or the air warmed by the heater core 76 is sent into the vehicle cabin.

The refrigerant flowing out from a refrigerant outlet of the heater core 76 is output to the three-way valve 220 side. In the example of FIG. 3, a branch point P2 for branching a third flow path (circulation line) for sending the refrigerant flowing out from the refrigerant outlet of the heater core 76 to the cooling system and a fourth flow path (circulation line) for causing the refrigerant to flow into the air conditioning device 70 through the three-way valve 220 is provided in a refrigerant flow path (pipe). The refrigerant branched to the third refrigerant line by the branch point P2 flows into the radiator 202 side within the FC cooling system 200. On the other hand, the refrigerant branched to the fourth refrigerant line by the branch point P2 flows into the air conditioning device 70 again and circulates within the air conditioning device 70.

The three-way valve 220 performs valve switching according to the control of the FC control device 146 to control a flow path so that the refrigerant flowing out from the refrigerant outlet of the heater core 76 is allowed to flow into the radiator 202 side within the FC cooling system 200 or circulate within the air conditioning device 70.

For example, the control device 80 controls the operation of the air conditioning device 70 so that the air volume and temperature are set by the occupant of the electric vehicle 10 and the like. For example, the FC control device 146 causes the air conditioning device 70 to be operated regardless of the operation of the occupant when the electric power generated by the FC system 100 (for example, surplus power) is consumed.

[Auxiliary Equipment Control by Request from FC Control Device]

Next, a specific example in which the auxiliary equipment is controlled according to the request from the FC control device 146 will be described. Hereinafter, the air conditioning device 70 will be used as an example of the auxiliary equipment. For example, the FC control device 146 performs control for operating the air conditioning device 70 when a predetermined condition is satisfied. The predetermined condition is, for example, that there is a request for generating electric power for a purpose other than electric power generation (for example, warm-up of the FC system 100 or the like) when the electric vehicle 10 is stopped and the battery 42 cannot be charged with the electric power generated by the power generation (hereinafter referred to as a "first condition"). The state in which the battery 42 cannot be charged with the electric power generated by the power generation is, for example, a state in which the SOC of the battery 42 is greater than or equal to a predetermined value (for example, when the battery 42 is fully charged or close to being fully charged). When the first condition is satisfied, the FC control device 146 causes the air conditioning device 70 to be operated regardless of the presence or absence of an occupant or the presence or absence of an operation of the occupant and to consume the surplus power generated by the FC system 100. For example, the FC control device 146 may cause the air conditioning device 70 to be operated by switching, for example, the refrigerant from the FC stack 110 using the three-way valve 220 shown in FIG. 3 described above so that the refrigerant flows into the air conditioning device 70 via the three-way valve 220. Thereby, surplus power can be consumed and the temperature of the refrigerant can be controlled by the FC cooling system 200 and the air conditioning device 70.

The predetermined condition may be that it is necessary to operate the air conditioning device 70 as well as the FC system 100 so that an amount of generated heat is increased (hereinafter referred to as a "second condition"). The control under the second condition is, for example, control when the warm-up of the FC system 100 or the like is performed in a short time. When the second condition is satisfied, the FC control device 146 performs switching using the three-way valve 220 shown in FIG. 3 described above so that the refrigerant from the FC stack 110 flows into the air conditioning device 70 via the three-way valve 220 and causes the air conditioning device 70 to be operated. According to the above operation, the heat generated by both the FC system 100 and the air conditioning device 70 can raise the temperature of the refrigerant in a short time and consequently the warm-up of the FC system 100 can be implemented in a short time.

The predetermined condition may be that it is necessary to raise the temperature of the FC stack 110 according to the heat generated by the air conditioning device 70 (hereinafter referred to as a "third condition"). When the third condition is satisfied, the FC control device 146 performs switching using the three-way valve 220 shown in FIG. 3 described above so that the refrigerant from the FC stack 110 flows into the air conditioning device 70 via the three-way valve 220 and causes the air conditioning device 70 to be operated. According to the above operation, the temperature of the refrigerant can be raised by the air conditioning device 70 and the temperature of the FC stack 110 can be raised by supplying the refrigerant to the FC stack 110.

The FC control device 146 controls the operation of the air conditioning device 70 according to the above-described predetermined conditions, except for the request of the occupant of the electric vehicle 10. When the operation (on and off) of the air conditioning device 70 is controlled, the FC control device 146 performs control for limiting the deterioration of the device (for example, the heater 72) due to the iteration of on and off.

Figure 4:
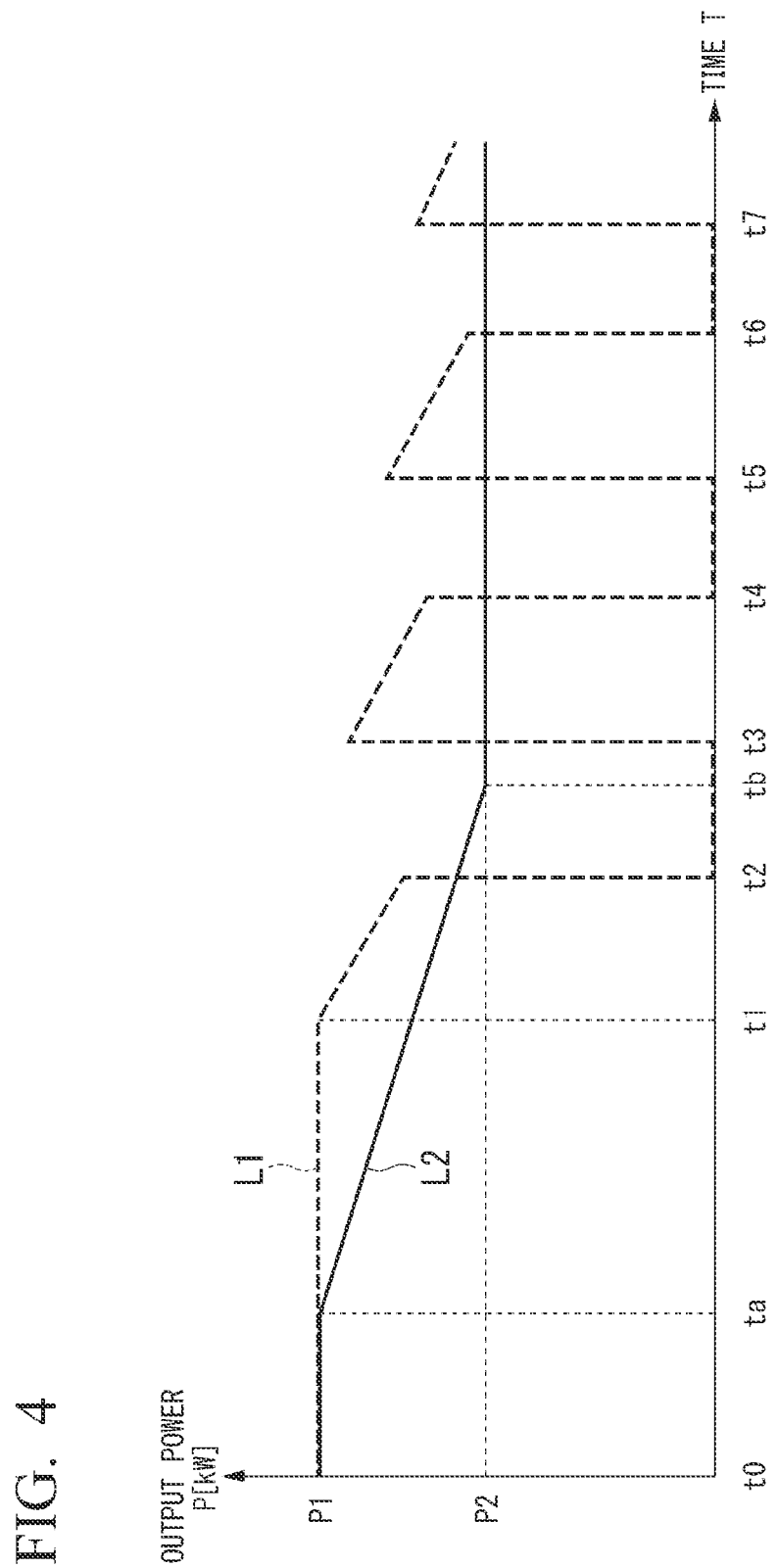
FIG. 4 is a diagram for describing on/off control of an air conditioning device according to a request of an FC control device.

Here, the on/off control of the air conditioning device 70 according to the request of the FC control device 146 will be specifically described. FIG. 4 is a diagram for describing on/off control of the air conditioning device 70 according to the request of the FC control device 146. In the example of FIG. 4, an example of control for the heater 72 included in the air conditioning device 70 is shown. The horizontal axis of FIG. 4 represents time T and the vertical axis represents a maximum output P [kW] of the heater 72. In the example of FIG. 4, a graph line L1 shows a state of output power of the heater 72 according to first power control and a graph line L2 shows a state of output power of the heater 72 according to second power control. In the example of FIG. 4, it is assumed that the time progresses in the order of times t0, t1, t2, t3, t4, t5, t6, and t7.

For example, the FC control device 146 requests power consumption by the heater 72, for example, when the first condition is satisfied. Here, in the case of the first power control, the heater 72 is controlled so that the maximum output becomes an amount of output P1 at time t0. The amount of output P1 is, for example, about 6 [kW], but is not limited thereto. When the temperature of the heater 72 becomes greater than or equal to the first predetermined temperature, the protection control of the heater 72 is performed and the control for forcibly turning off the heater 72 (hereinafter referred to as "forced off control") is executed. In the example of FIG. 4, the forced off control is executed at time t1. When the temperature of the heater 72 drops due to the power off and the temperature becomes lower than a second predetermined temperature (second predetermined temperature<first predetermined temperature) at time t3, a power supply of the heater 72 is turned on again, so that control for causing the heater 72 to be operated and consume electric power is resumed. When the temperature reaches a predetermined temperature at time t4, the forced off control of the heater 72 is executed again. The above-described control is iteratively executed after time t4 (times t5, t6, t7, and the like). However, because forced off control is executed from a high load (a state in which the maximum output is large) and on control and off control are iteratively executed in the first power control described above, there is a possibility that deterioration of the heater 72 will be caused. Further, because there is a stop time period (a period from time t2 to time t3, a period from time t4 to time t5, or a period from time t6 to time t7 in the example of FIG. 3) in the first power control, the heater 72 cannot consume the surplus power during the above period.

Therefore, the FC control device 146 executes second power control for adjusting a timing and a degree at which the output power of the heater 72 is limited on the basis of, for example, a change in the temperature of the refrigerant passing through the heater 72 and a change in the temperature of the heater main body. In the second power control, the FC control device 146 causes the heater 72 to be operated so that the maximum output becomes the amount of output P1 at time t0, subsequently predicts a point in time when the temperature of the heater 72 becomes a temperature at which the forced off control is started in the future on the basis of a change (a degree of increase) in the temperature of the refrigerant with the elapse of time, and starts limiting a value of the maximum output before the predicted point in time. In the example of FIG. 4, the FC control device 146 performs control for reducing output power from time ta which is a predetermined time period earlier than time t1 when the temperature of the heater 72 is predicted to be greater than or equal to the predetermined value at time t1 on the basis of a change in the temperature according to the elapse of time from time t0. Although the output power is gradually (linearly) reduced at a certain degree of limitation with the elapse of time from time ta in the example of FIG. 4, the degree of limitation may be changed step by step (non-linearly) and the output power may be reduced instead thereof. In this way, because the FC control device 146 gradually limits the output power value of the heater 72 before the forced off control due to the temperature rise of the heater 72 is executed, the number of times the heater 72 is forcibly turned off can be reduced. As a result, the deterioration of the heater 72 can be limited. Further, because the heater 72 can continue the operation of the heater 72, the heater 72 can be utilized more effectively and more appropriate power consumption can be maintained.

When the output power is limited, the FC control device 146 may perform control so that the output power of the heater 72 is uniform at the amount of output P2. The amount of output P2 is, for example, a minimum value required for heating the refrigerant using the heater 72. The amount of output P2 may be, for example, a value of power consumption by the heater 72 which is maintained regardless of the temperature of the heater 72 becoming higher than or equal to the first predetermined temperature at which the forced off control is executed. The amount of output P2 is, for example, about 4 [kW], but is not limited thereto and may be appropriately changed according to the performance of the heater 72 and the like. In the example of FIG. 4, the FC control device 146 limits the output power of the heater 72 so that the maximum output becomes the amount of output P2 after time tb. The FC control device 146 limits the output power to the amount of output P2, so that, even if the forced off control is executed in the above state, it is possible to limit the deterioration of the heater 72 because a change in electric power is smaller than that when the forced off control has been executed from the state of the amount of output P1.

The FC control device 146 may adjust the output power in a range in which the forced off control is not started on the basis of the change in the temperature of the heater 72. Thereby, because it is possible to limit the iteration of the forced off control of the heater 72 as in the first power control, the durability of the heater 72 can be ensured.

For example, when forced off control is performed due to a temperature rise or the like, the FC control device 146 may not perform on control (operation control) of the heater 72 until a predetermined time period elapses after the forced off control is performed.

In addition to the above-described air conditioning device 70, the auxiliary equipment according to the embodiment may include the compressor 114, the exhaust gas circulation pump 122, the first refrigerant supply pump 212, and the like as auxiliary equipment included in the FC system 100. For example, the FC control device 146 causes electric power to be consumed by causing at least one of the air conditioning device 70, the compressor 114, the exhaust gas circulation pump 122, and the first refrigerant supply pump 212 to be operated when the SOC of the battery 42 is greater than or equal to a predetermined value in control for performing the power generation for the warm-up of the FC system 100 or the like when the electric vehicle 10 is stopped.

Other auxiliary equipment may include a three-way valve 220. The three-way valve 220 switches the flow path of the refrigerant, so that a plurality of pieces of auxiliary equipment can be linked to perform the temperature management inside the fuel cell and the electric vehicle 10 and the number of candidates for auxiliary equipment that consume electric power can be increased.

The FC control device 146 may perform control so that the temperature of the FC stack 110 can increase according to the output of at least one of the air conditioning device 70, the compressor 114, the exhaust gas circulation pump 122, and the first refrigerant supply pump 212 in accordance with a situation of the battery 42. Thereby, surplus power can be consumed and the warm-up control of the FC system 100 can be performed by controlling the temperature of the air conditioning device 70 or the like. Therefore, it is possible to limit the deterioration of the fuel cell and operate the fuel cell more efficiently under an extremely low temperature environment.

The control device 80 has at least a first control mode in which the surplus power generated by the FC system 100 is consumed by operating the auxiliary equipment, and a second control mode in which the auxiliary equipment is operated according to an instruction from the occupant. When the first control mode is executed, the control device 80 may control a timing or a degree at which an amount of output of electric power of the auxiliary equipment is limited by providing a predetermined range for a temperature associated with the auxiliary equipment.

Figure 5:
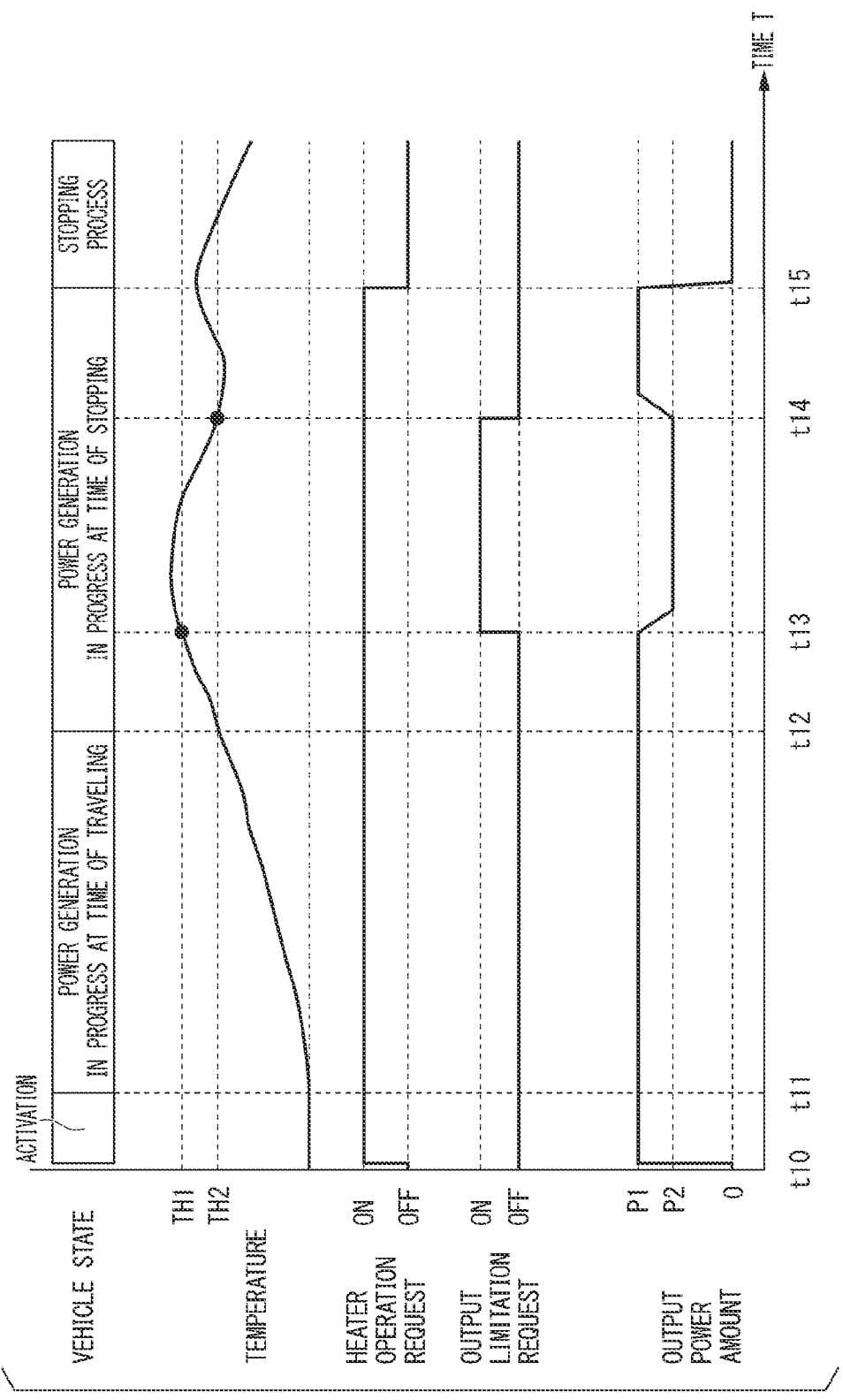
FIG. 5 is a diagram for describing switching between whether or not to limit an amount of output of electric power on the basis of temperature information in a scene in which a first control mode is executed.

FIG. 5 is a diagram for describing switching between whether or not to limit an amount of output of electric power on the basis of temperature information in a scene in which the first control mode is executed. The horizontal axis of FIG. 5 represents time T and the vertical axis represents a state related to power generation of the electric vehicle 10, a change in the temperature of the refrigerant, an on/off request for the operation of the heater 72, on/off of a request for limiting the amount of output of the heater 72, and an amount of output power of the heater 72. The temperature may be the temperature of the heater main body instead of the temperature of the refrigerant. In the example of FIG. 5, it is assumed that the time progresses in the order of times t10, t11, t12, t13, t14, and t15.

In the example of FIG. 5, time t10 is a point in time when the drive source of the electric vehicle 10 is in the ignition on state and the electric vehicle 10 is activated. At the above time t10, the FC control device 146 outputs a request (an on request) for operating the heater 72. The FC control device 146 sets the amount of output power to the amount of output P1 before limitation. At times t11 to t12, a state in which the drive source is in the ignition on state according to the operation of the occupant and the electric vehicle 10 is generating electric power at the time of traveling is shown. In this state, because the heater 72 is operated by the generated electric power, for example, the temperature of the heater 72 is rising.

At times t12 to t15, a state in which electric power is being generated when the electric vehicle 10 is stopped is shown. Time t12 is a point in time when the drive source is in the ignition off state according to the operation of the occupant. In the example of FIG. 5, the temperature of the heater 72 rises because the power generation is continued and the output is not limited even after time t12. Here, the FC control device 146 outputs a control signal for limiting the output to the heater 72 at time t13 when the temperature of the heater 72 has reached a first threshold value TH1. The first threshold value TH1 is a temperature lower than the temperature at which the heater 72 is forcibly turned off (the first predetermined temperature or higher). The heater 72 that has received the output limitation request controls the output power amount so that the amount of output gradually becomes the amount of output P2 with the elapse of time.

The FC control device 146 releases the limitation of the output power at time t14 when the temperature becomes less than a second threshold value TH2 and controls the output power of the heater 72 so that the amount of output becomes the amount of output P1 again. The second threshold value TH2 is a value smaller than the first threshold value TH1. In this case, the FC control device 146 may perform control so that the output value does not increase in a short time and the amount of output gradually becomes the amount of output P1. In this way, when an operation of switching between whether or not to limit the output power is performed, a predetermined temperature range (the first and second threshold values TH1 and TH2) is provided in consideration of hysteresis, so that it is possible to limit an operation in which the switching of limitation control due to temperature fluctuation (hunting) or the like is iteratively executed and it is possible to perform more appropriate operation control of the auxiliary equipment.

At time t15, when the power generation at the time of stopping is completed, the control (off control) for stopping the operation of the heater 72 is executed as a stopping process. For example, the control as shown in FIG. 5 may be executed only under a predetermined environment such as a temperature or a season. For example, the control may be executed when the temperature of the FC system 100 or the outside air temperature is lower than or equal to a predetermined temperature (for example, 20 [° C.]) or may be executed even if the temperature of the FC system 100 or the outside air temperature exceeds a predetermined temperature during a winter period after the determination of the winter period or the like is made. The FC control device 146 may change an output request for the auxiliary equipment in accordance with a predetermined environment such as a temperature or a season.

At least one of pieces of auxiliary equipment that consume surplus power may include high-voltage auxiliary equipment. Although the auxiliary equipment is generally controlled by a low-voltage battery of 12 [V] system, it is possible to cause electric power to be consumed more efficiently, for example, by causing the auxiliary equipment, which is controlled by a high-voltage battery based on a fuel cell (for example, a battery having a voltage higher than 12 [V]), to consume surplus power.

[Processing Flow]

Figure 6:
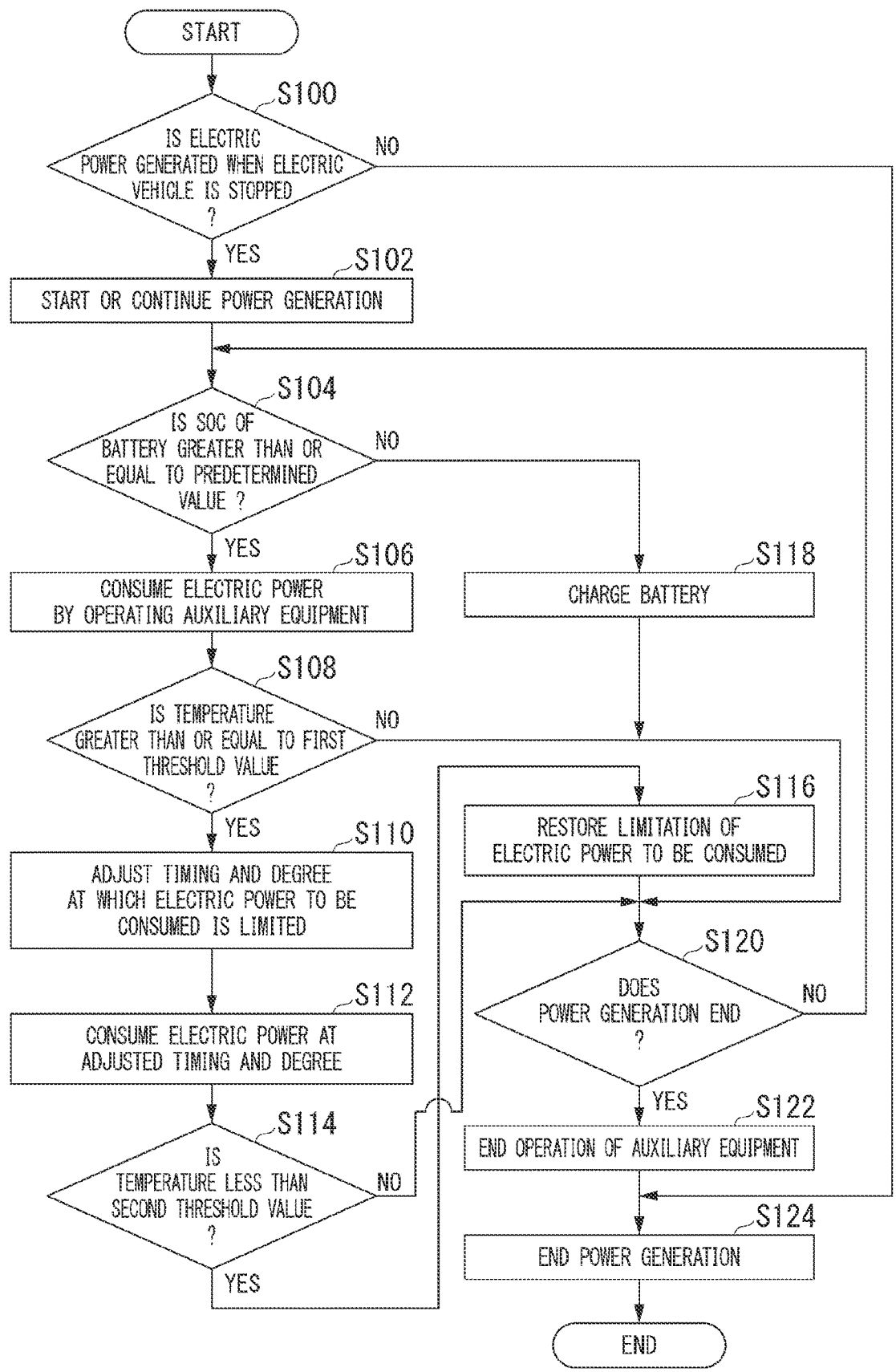
FIG. 6 is a flowchart showing a flow of a process of a series of processing steps executed by an electric vehicle including the FC system.

Hereinafter, a flow of a process executed by the computer of the FC system 100 according to the embodiment will be described using a flowchart. In the following process, a process related to the power generation of the FC system 100 and power consumption by the auxiliary equipment when the electric vehicle 10 is stopped will be described. FIG. 6 is a flowchart showing a flow of a series of processing steps executed by the electric vehicle 10 including the FC system 100. In the example of FIG. 6, the control device 80 determines whether or not to generate electric power when the electric vehicle 10 is stopped (for example, the ignition off state of the drive source) (step S100). When it is determined that power generation is performed at the time of stopping of the vehicle, the control device 80 starts the power generation when the electric vehicle 10 is not generating electric power from a state in which the electric vehicle 10 is in operation (for example, the ignition on state of the drive source) and continues power generation when power generation is being performed from the state in which the electric vehicle 10 is in operation (step S102).

Next, the FC control device 146 determines whether or not an SOC of the battery 42 is greater than or equal to a predetermined value (step S104). When it is determined that the SOC of the battery 42 is greater than or equal to the predetermined value, the FC control device 146 causes auxiliary equipment to be operated and causes the auxiliary equipment to consume electric power (step S106). In the processing of step S106, a maximum output value is set to an amount of output P1. In the following example, it is assumed that at least a part of the configuration including the FC cooling system 200 and the air conditioning device 70 using the refrigerant is operated as auxiliary equipment.

Next, the FC control device 146 determines whether or not the temperature of the refrigerant supplied to the FC stack 110 and the air conditioning device 70 is greater than or equal to the first threshold value TH1 (step S108). When it is determined that the temperature of the refrigerant is greater than or equal to the first threshold value TH1, the FC control device 146 adjusts a timing and a degree at which the output value for the auxiliary equipment to consume electric power is limited to a value smaller than the amount of output P1 set by the processing of step S106 (step S110). Next, the FC control device 146 causes the auxiliary equipment to consume electric power at the timing and the degree of limitation that have been adjusted (step S112). In the processing of step S112, for example, the output value is adjusted so that the amount of output gradually becomes the amount of output P2 (P2<P1) before a point in time when the temperature of the refrigerant reaches the temperature at which the heater 72 in the air conditioning device 70 is forcibly turned off and power consumption by the auxiliary equipment is executed.

Next, the FC control device 146 determines whether or not the temperature of the refrigerant is less than the second threshold value TH2 (step S114). The second threshold value TH2 is a value smaller than the first threshold value TH1. When it is determined that the temperature is less than the second threshold value TH2, the FC control device 146 performs control for restoring the limitation of the electric power that is consumed by the auxiliary equipment (step S116). Thereby, electric power can be consumed more efficiently in a temperature range in which forced off control is not executed.

When it is determined that the SOC of the battery 42 is not greater than or equal to a predetermined value in the processing of step S104, the FC control device 146 charges the battery 42 (step S118). After the processing of step S116 or step S118 is completed, the FC control device 146 determines whether or not to end the power generation when it is determined that the temperature is not greater than or equal to the first threshold value TH1 in the processing of step S108 or when it is determined that the temperature is not less than the second threshold value TH2 in the processing of step S114 (step S120). When it is determined that the power generation is not ended, the process returns to the processing of step S104. When it is determined that the power generation is ended according to an operation of the occupant of the electric vehicle 10 or another condition for ending the power generation, the FC control device 146 ends the operation of the auxiliary equipment (step S122) and ends the power generation in the FC system 100 (step S124). When it is determined that power generation is not performed at the time of stopping of the electric vehicle 10 in the processing of step S100, the FC control device 146 ends power generation in the FC system 100 if electric power is being generated before the stop (step S124) and ends the process as it is if electric power is not being generated before the stop. Thereby, the process of the present flowchart ends.

According to the above-described embodiment, there is provided a control system including: a fuel cell configured to generate electric power using an anode and a cathode; a power storage device (the battery system 40) capable of storing the electric power generated by the fuel cell; auxiliary equipment to which the electric power is able to be supplied; and a controller (the FC control device 146 and the control device 80) configured to control operations of the fuel cell and the auxiliary equipment, wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment, so that the operation of the auxiliary equipment that consumes the electric power generated by the fuel cell can be controlled more appropriately.

Specifically, according to the embodiment, deterioration of the auxiliary equipment can be limited by performing control so that on/off control of the auxiliary equipment for consuming surplus power is not iterated. According to the embodiment, the output control for adjusting the temperature is executed before the control for forcibly turning off the auxiliary equipment is executed due to the temperature rise due to the power consumption, so that the auxiliary equipment can be continuously operated without being subjected to forced off control.

The above-described embodiment can be represented as follows.

A control system including:

a fuel cell configured to generate electric power using an anode and a cathode;

a power storage device capable of storing the electric power generated by the fuel cell;

auxiliary equipment to which the electric power is able to be supplied;

a storage device storing a program; and a hardware processor, wherein the hardware processor executes the program stored in the storage device to:

control operations of the fuel cell and the auxiliary equipment;

perform control so that the electric power is consumed by the auxiliary equipment in accordance with a power storage state of the power storage device at the time of power generation of the fuel cell; and adjust one or both of a timing and a degree at which electric power to be consumed by the auxiliary equipment is limited on the basis of temperature information associated with the auxiliary equipment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control system comprising:

a fuel cell configured to generate electric power using an anode and a cathode;

a power storage device capable of storing the electric power generated by the fuel cell;

auxiliary equipment to which the electric power is able to be supplied; and a controller configured to control operations of the fuel cell and the auxiliary equipment, wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment, wherein the controller causes the amount of output of the electric power to be consumed by the auxiliary equipment to be reduced before a predicted point in time when a temperature associated with the auxiliary equipment is predicted to be a temperature at which an operation of the auxiliary equipment will be forcibly stopped in the future.

2. The control system according to claim 1, wherein the auxiliary equipment includes at least one of a compressor that pumps an oxidizing gas to the fuel cell, a pump that circulates and supplies a fuel gas to the fuel cell, and a cooling pump that supplies a refrigerant to the fuel cell and an air conditioning device.

3. The control system according to claim 2, wherein the controller performs control so that a temperature of the fuel cell is able to be increased according to an output of at least one of the compressor, the pump, the air conditioning device, and the cooling pump in accordance with a situation of the power storage device.

4. A moving body comprising the control system according to claim 1.

5. The moving body according to claim 4, wherein the moving body includes a vehicle, and wherein the controller causes surplus power of the fuel cell to be consumed by causing an air conditioning device within the vehicle to be operated independently of the presence or absence of an occupant of the vehicle or the presence or absence of an operation of the occupant in accordance with a power storage state of the power storage device when power generation of the fuel cell is performed at the time of stopping of the vehicle.

6. The moving body according to claim 4, wherein the controller performs control for causing the moving body to be retracted to a predetermined position when an abnormality in the moving body has been detected.

7. A control method comprising:

controlling, by a computer of a control system including a fuel cell configured to generate electric power using an anode and a cathode, a power storage device capable of storing the electric power generated by the fuel cell, and auxiliary equipment to which the electric power is able to be supplied, operations of the fuel cell and the auxiliary equipment;

performing, by the computer, control so that the electric power is consumed by the auxiliary equipment in accordance with a power storage state of the power storage device at the time of power generation of the fuel cell; and adjusting, by the computer, one or both of a timing and a degree at which electric power to be consumed by the auxiliary equipment is limited on the basis of temperature information associated with the auxiliary equipment, wherein the computer causes the amount of output of the electric power to be consumed by the auxiliary equipment to be reduced before a predicted point in time when a temperature associated with the auxiliary equipment is predicted to be a temperature at which an operation of the auxiliary equipment will be forcibly stopped in the future.

8. A control system comprising:

a fuel cell configured to generate electric power using an anode and a cathode;

a power storage device capable of storing the electric power generated by the fuel cell;

auxiliary equipment to which the electric power is able to be supplied; and a controller configured to control operations of the fuel cell and the auxiliary equipment, wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment, wherein the controller adjusts the degree at which electric power to be consumed by the auxiliary equipment is limited so that the amount of output of the electric power to be consumed by the auxiliary equipment is gradually reduced until the amount of output to be consumed by the auxiliary equipment reaches a predetermined amount of output when a temperature associated with the auxiliary equipment is predicted to be a temperature at which an operation of the auxiliary equipment will be forcibly stopped in the future.

9. A control system comprising:
a fuel cell configured to generate electric power using an anode and a cathode;
a power storage device capable of storing the electric power generated by the fuel cell;
auxiliary equipment to which the electric power is able to be supplied; and
a controller configured to control operations of the fuel cell and the auxiliary equipment,
wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment,
wherein the auxiliary equipment includes a flow path switching valve that switches between a flow path for circulating a refrigerant for cooling the fuel cell within the control system and a flow path for supplying the refrigerant to an air conditioning device included in the auxiliary equipment.

10. A control system comprising:
a fuel cell configured to generate electric power using an anode and a cathode;
a power storage device capable of storing the electric power generated by the fuel cell;
auxiliary equipment to which the electric power is able to be supplied; and
a controller configured to control operations of the fuel cell and the auxiliary equipment,
wherein the controller performs control so that the electric power is consumed by the auxiliary equipment in accordance with a power storage state of the power storage device at the time of power generation of the fuel cell and adjusts one or both of a timing and a degree at which electric power to be consumed by the auxiliary equipment is limited on the basis of temperature information associated with the auxiliary equipment,
wherein the controller includes a control mode in which surplus power generated by the fuel cell is consumed by the auxiliary equipment and controls the amount of output of electric power to be consumed by the auxiliary equipment by providing a predetermined range for a temperature associated with the auxiliary equipment when the control mode is executed.

11. A control method comprising:
controlling, by a computer of a control system including a fuel cell configured to generate electric power using an anode and a cathode, a power storage device capable of storing the electric power generated by the fuel cell, and auxiliary equipment to which the electric power is able to be supplied, operations of the fuel cell and the auxiliary equipment;
performing, by the computer, control so that the electric power is consumed by the auxiliary equipment in accordance with a power storage state of the power storage device at the time of power generation of the fuel cell; and
adjusting, by the computer, one or both of a timing and a degree at which electric power to be consumed by the auxiliary equipment is limited on the basis of temperature information associated with the auxiliary equipment,
wherein the computer adjusts the degree at which electric power to be consumed by the auxiliary equipment is limited so that the amount of output of the electric power to be consumed by the auxiliary equipment is gradually reduced until the amount of output of the electric power to be consumed by the auxiliary equipment reaches a predetermined amount of output when a temperature associated with the auxiliary equipment is predicted to be a temperature at which an operation of the auxiliary equipment will be forcibly stopped in the future.

12. A control method comprising:
controlling, by a computer of a control system including a fuel cell configured to generate electric power using an anode and a cathode, a power storage device capable of storing the electric power generated by the fuel cell, and auxiliary equipment to which the electric power is able to be supplied, operations of the fuel cell and the auxiliary equipment;
performing, by the computer, control so that the electric power is consumed by the auxiliary equipment in accordance with a power storage state of the power storage device at the time of power generation of the fuel cell; and
adjusting, by the computer, one or both of a timing and a degree at which electric power to be consumed by the auxiliary equipment is limited on the basis of temperature information associated with the auxiliary equipment,
wherein the auxiliary equipment includes a flow path switching valve that switches between a flow path for circulating a refrigerant for cooling the fuel cell within the control system and a flow path for supplying the refrigerant to an air conditioning device included in the auxiliary equipment.

13. A control method comprising:
controlling, by a computer of a control system including a fuel cell configured to generate electric power using an anode and a cathode, a power storage device capable of storing the electric power generated by the fuel cell, and auxiliary equipment to which the electric power is able to be supplied, operations of the fuel cell and the auxiliary equipment;
performing, by the computer, control so that the electric power is consumed by the auxiliary equipment in accordance with a power storage state of the power storage device at the time of power generation of the fuel cell; and
adjusting, by the computer, one or both of a timing and a degree at which electric power to be consumed by the auxiliary equipment is limited on the basis of temperature information associated with the auxiliary equipment,
wherein the computer includes a control mode in which surplus power generated by the fuel cell is consumed by the auxiliary equipment and controls the amount of output of electric power to be consumed by the auxiliary equipment by providing a predetermined range for a temperature associated with the auxiliary equipment when the control mode is executed.

* * * * *